United States Patent
Griffin

(10) Patent No.: US 12,121,008 B1
(45) Date of Patent: Oct. 22, 2024

(54) BIRDFEEDER FOR FEEDING SELECTED BIRDS

(71) Applicant: Michael Griffin, New Field, NY (US)

(72) Inventor: Michael Griffin, New Field, NY (US)

(*) Notice: Subject to any disclaimer, the term of this patent is extended or adjusted under 35 U.S.C. 154(b) by 29 days.

(21) Appl. No.: 18/136,190

(22) Filed: Apr. 18, 2023

(51) Int. Cl.
*A01K 39/01* (2006.01)

(52) U.S. Cl.
CPC ................. *A01K 39/0113* (2013.01)

(58) Field of Classification Search
CPC .................................................. A01K 39/0113
See application file for complete search history.

(56) References Cited

U.S. PATENT DOCUMENTS

| | | | |
|---|---|---|---|
| 6,758,164 B2* | 7/2004 | Rich | A01K 39/012 119/52.3 |
| 7,237,507 B1 | 7/2007 | Colwell | |
| D681,884 S | 5/2013 | Kingdon | |
| 8,904,959 B2 | 12/2014 | Lush | |
| 2004/0123808 A1 | 7/2004 | Dunn | |
| 2005/0145182 A1 | 7/2005 | Marshall | |
| 2008/0121186 A1* | 5/2008 | Mindell | A01K 39/0113 119/52.3 |
| 2011/0121186 A1 | 5/2011 | Shah et al. | |
| 2011/0174233 A1 | 7/2011 | Lush | |
| 2012/0037080 A1* | 2/2012 | Hepp | A01K 39/012 119/51.01 |
| 2015/0320017 A1* | 11/2015 | Hepp | A01K 39/0113 119/52.3 |

FOREIGN PATENT DOCUMENTS

GB   2443786   5/2008

* cited by examiner

*Primary Examiner* — Yvonne R Abbott-Lewis

(57) ABSTRACT

A birdfeeder apparatus for preventing large birds from accessing birdseed includes a housing which is configured for holding and dispensing birdseed. The housing includes a bird support configured to support desired birds. A plurality of guards is coupled to and extend outwardly away from the housing. A spacing between adjacent pairs of the plurality of guards has a size configured to obstruct undesired birds larger than the desired birds from landing on the bird support.

11 Claims, 5 Drawing Sheets

BIRDFEEDER FOR FEEDING SELECTED BIRDS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bird feeder apparatus and more particularly pertains to a new bird feeder apparatus for preventing large birds from accessing birdseed.

(2) Description of Related Art Including Information Disclosed Under 37 CFR 1.97 and 1.98

Bird feeders filled with birdseed are often used to attract birds. But some birds interfere with other bird species' access to bird feeders. For example, blue jays, while not typically predators of other birds, are very territorial and will often attack or harass smaller birds to prevent those birds from feeding at a bird feeder. When a user of a bird feeder does not want to attract blue jays, wants to attract a greater variety of birds, or wants to attract birds which would otherwise be prevented from accessing a bird feeder due to a blue jay or other large bird, a means of prevention of blue jays and other large birds is needed.

The prior art discloses several bird feeders which provide a protective enclosure that allows only birds which are small enough to fit through openings in the enclosure to access the birdseed in the bird feeder. However, these apparatuses obscure the view of the birds while they feed. The prior art fails to describe a bird feeder which has guards positioned to extend outwardly from the bird feeder adjacent to a perch to prevent larger birds from landing on a perch adjacent to the bird feeder. Such an arrangement blocks larger birds from landing while allowing the birds which are able to land to be viewed without significant obstruction.

BRIEF SUMMARY OF THE INVENTION

An embodiment of the disclosure meets the needs presented above by generally comprising a housing is configured for holding birdseed and comprises a base, a hopper, and a bird support. The base has a platform with an upper surface for supporting the birdseed thereon. The hopper is coupled to and extends upwardly from the base, and the hopper is configured to contain the birdseed and dispense the birdseed out of the hopper and onto the platform. The bird support is coupled to the base and is configured to support desired birds adjacent to the base, wherein the desired birds are defined as having a smaller size than the undesired birds. A plurality of guards is coupled to the housing and is configured to prevent undesired birds from landing on the bird support. The plurality of guards extends outwardly away from the hopper and is distributed along the bird support. Each pair of adjacent guards of the plurality of guards is spaced from each other at a spacing configured to obstruct the undesired birds from landing on the bird support between one of the pairs of adjacent guards.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
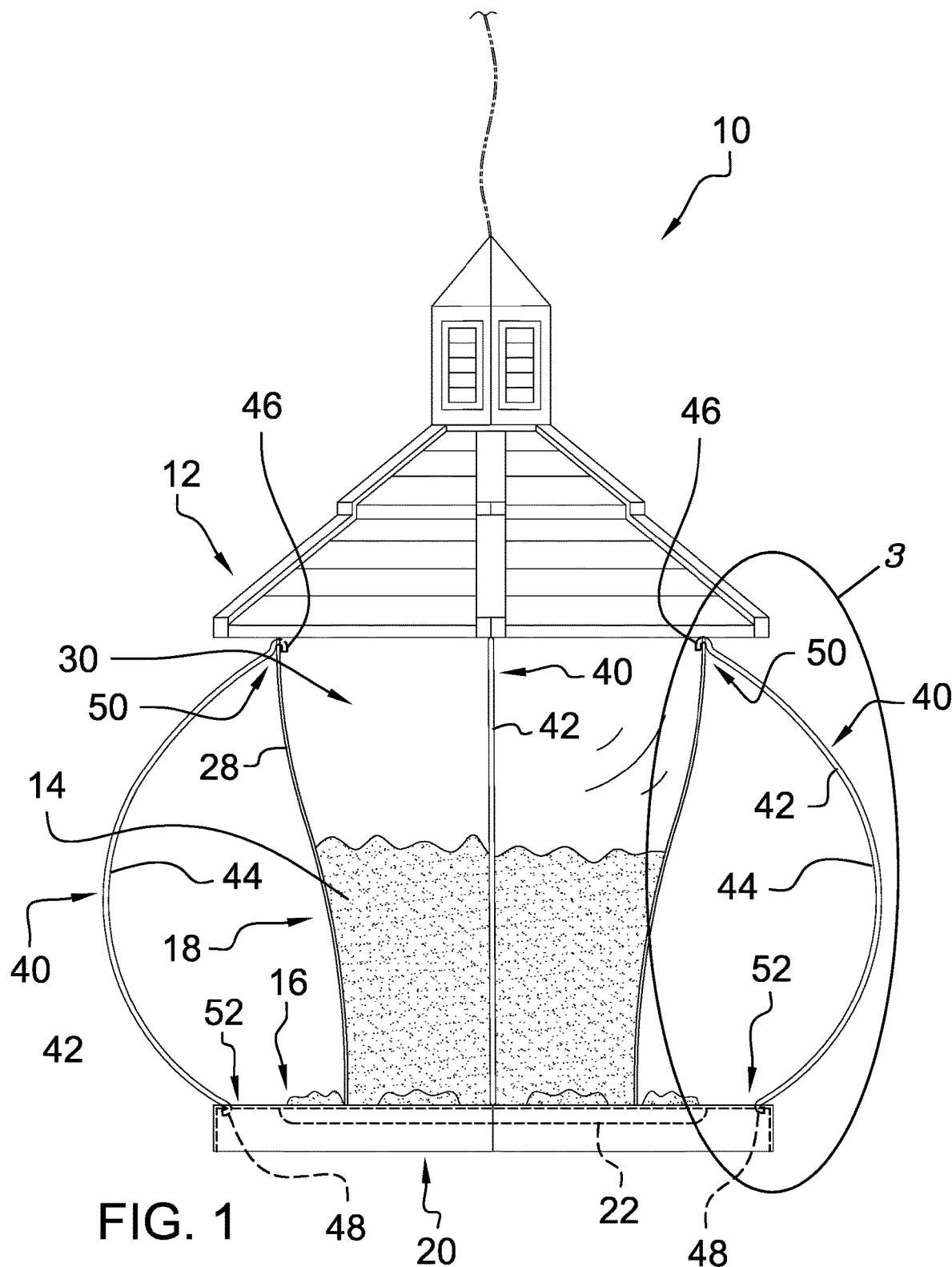
FIG. 1 is a front view of a birdfeeder apparatus according to an embodiment of the disclosure.
Figure 2:
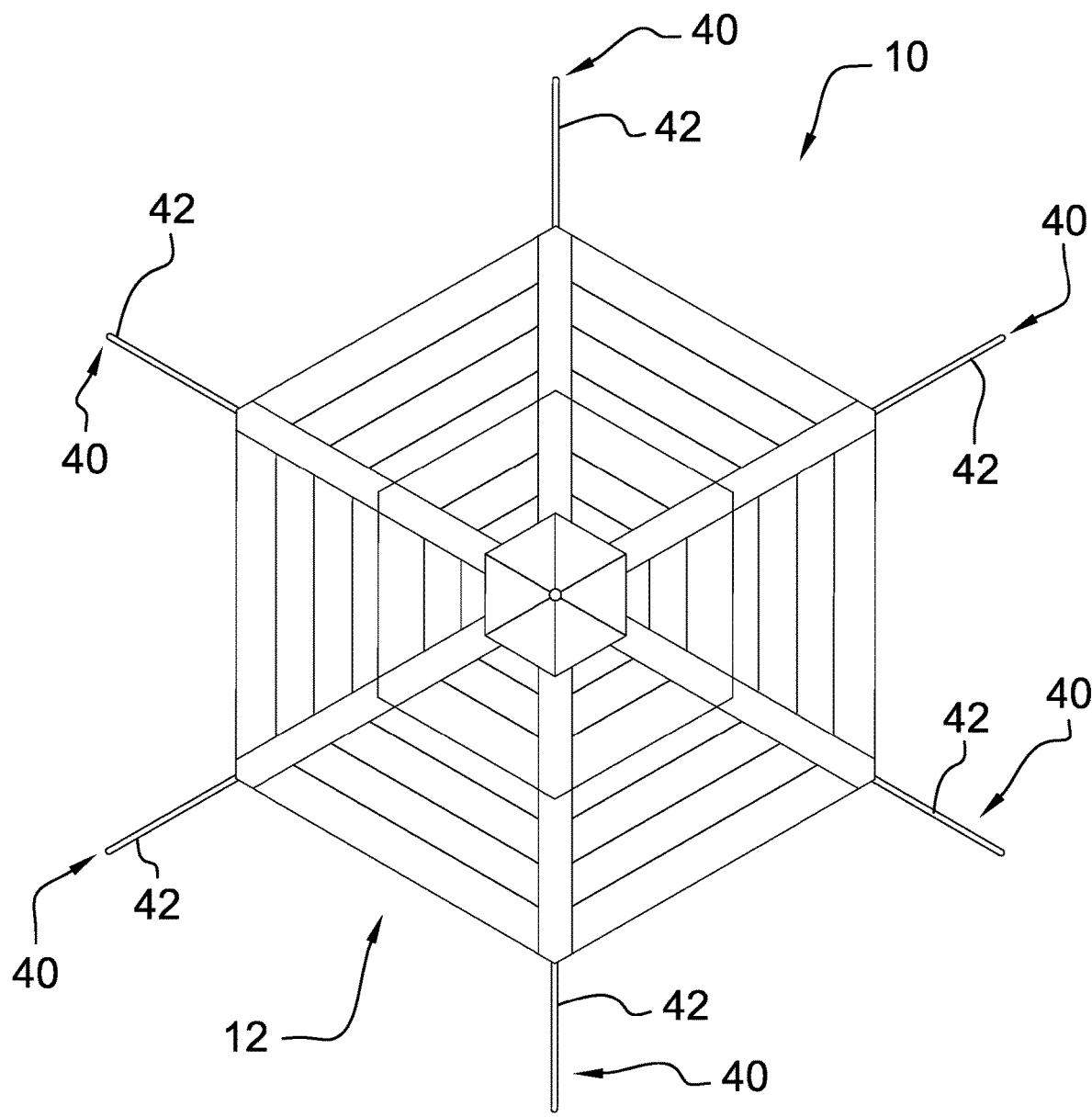
FIG. 2 is a top view of an embodiment of the disclosure.
Figure 3:
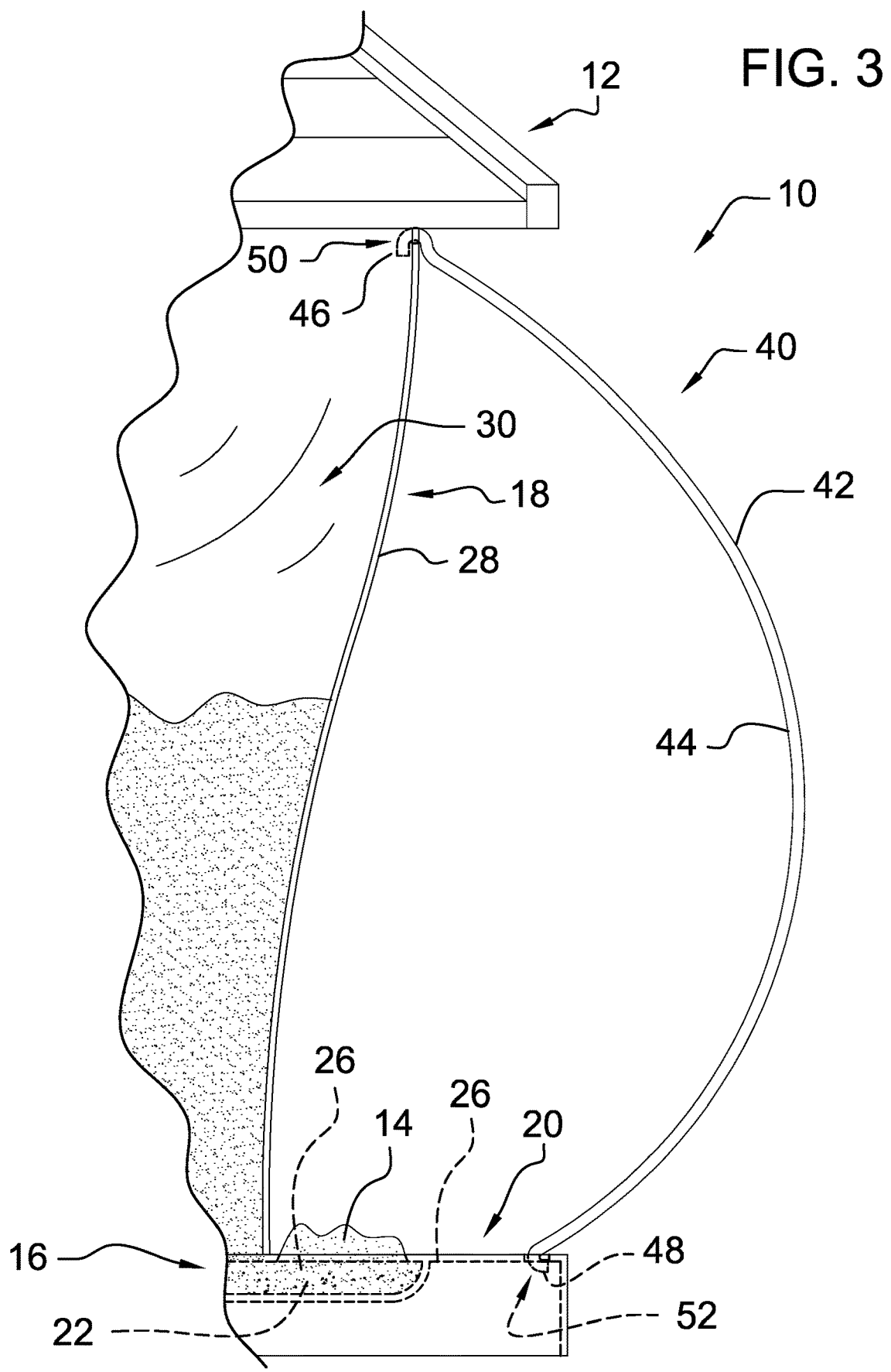
FIG. 3 is a detail view of one of a plurality of guards an embodiment of the disclosure seen in FIG. 1.
Figure 4:
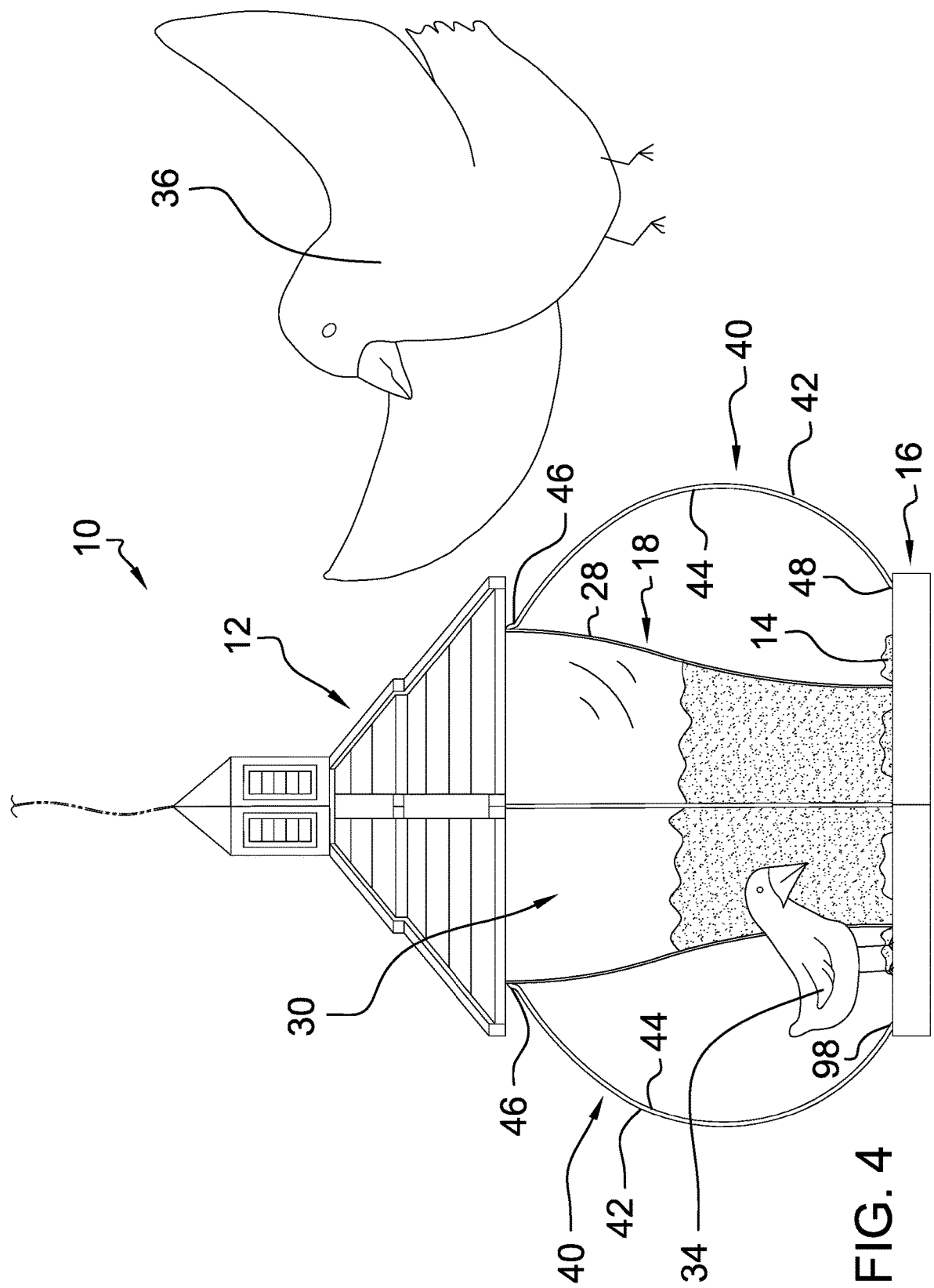
FIG. 4 is an in-use view of an embodiment of the disclosure.
Figure 5:
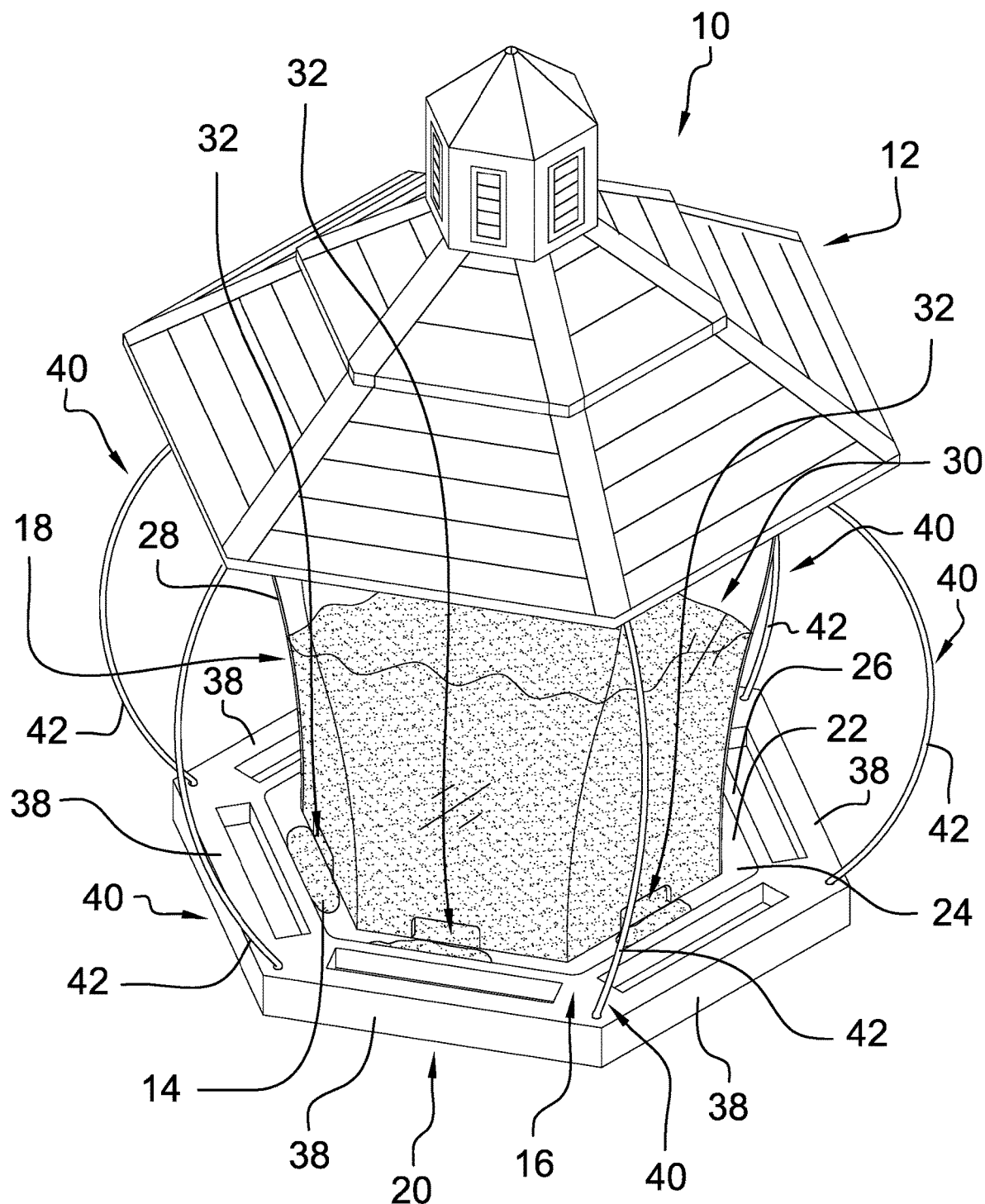
FIG. 5 is a perspective view of an embodiment of the disclosure.

With reference now to the drawings, and in particular to FIGS. 1 through 5 thereof, a new bird feeder apparatus embodying the principles and concepts of an embodiment of the disclosure and generally designated by the reference numeral 10 will be described.

As best illustrated in FIGS. 1 through 5, the birdfeeder apparatus 10 generally comprises a housing 12 configured for holding birdseed 14 and comprises a base 16, a hopper 18, and a bird support 20. The base 16 has a platform 22 with an upper surface 24 for supporting the birdseed 14 thereon. A perimeter lip 26 of the base 16 is coupled to and extends around the platform 22, and the perimeter lip 26 protrudes upwardly from the platform 22 to constrain the birdseed 14 to the upper surface 24 of the platform 22.

The hopper 18 is coupled to and extends upwardly from the base 16. The hopper 18 is configured to contain the birdseed 14 and dispense the birdseed 14 out of the hopper 18 and onto the platform 22. The hopper 18 comprises an outer wall 28 which bounds an interior space 30. The outer wall 28 has a plurality of openings 32 extending therethrough and into the interior space 30, each of which is positioned adjacent to the platform 22 such that birdseed 14 contained in the hopper 18 flows outwardly of the hopper 18 through each of the plurality of openings 32 and onto the platform 22. The plurality of openings 32 is circumferentially arranged around the hopper 18, and the openings 32 are evenly spaced from each other. At least a portion of the outer wall 28 is translucent to facilitate viewing of the interior space 30 through the outer wall 28. The hopper 18 also may have an alternative conventional structure which dispenses the birdseed 14 onto the platform 22. The hopper 18 may also have a door or similar structure which is movable to gain access to the interior space 30 to fill the hopper 18 with the birdseed 14.

The bird support 20 is coupled to the base 16 and is configured to support desired birds 34 adjacent to the base 16, wherein the desired birds 34 are defined as having a smaller size than the undesired birds 36. The bird support 20 comprises a plurality of perches 38, each of which is outwardly spaced from the base 16. Each perch 38 of the plurality of perches 38 is radially aligned with one of the openings 32 of the hopper 18.

A plurality of guards 40 is coupled to the housing 12 and is configured to prevent undesired birds 36 from landing on the bird support 20. The plurality of guards 40 extends outwardly away from the hopper 18 and is distributed along the bird support 20. Each pair of adjacent guards 40 of the plurality of guards 40 is spaced from each other at a spacing configured to obstruct the undesired birds 36 from landing on the bird support 20 between one of the pairs of adjacent guards 40. The spacing is less than 7.5 inches. The spacing is also large enough not to prevent the desired birds 34 from landing on the bird support 20 and may, for example, be greater than 6.5 inches. Each guard 40 of the plurality of guards 40 is positioned between adjacent perches 38 of the plurality of perches 38 and comprises a wire 42. The wire 42 of each guard 40 of the plurality of guards 40 extends arcuately from the hopper 18 to the bird support 20 and has a concave side 44 facing the hopper 18. The wire 42 of each guard 40 of the plurality of guards 40 also has a first hooked end 46 and a second hooked end 48. The first hooked end 46 engages one of a plurality of apertures 50 which extend through the outer wall 28 of the hopper 18. The second hooked end 48 engages one of a plurality of holes 52 which extend through the bird support 20.

In use, the birdseed 14 is dispensed via gravity onto the platform 22 from the hopper 18. The plurality of perches 38 are provided to allow the desired birds 34 to land on the bird support 20 and access the birdseed 14 on the platform 22. The spacing between each adjacent pair of guards 40 of the plurality of guards 40 is such that the guards 40 interfere with the undesired birds' 36 ability to land on the bird support 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A birdfeeder apparatus for preventing undesired birds from landing thereon, the apparatus comprising:
    a housing being configured for holding birdseed and comprising:
        a base having a platform with an upper surface for supporting the birdseed thereon;
        a hopper being coupled to and extending upwardly from the base, the hopper being configured to contain the birdseed and dispense the birdseed out of the hopper and onto the platform; and
        a bird support being coupled to the base and being configured to support desired birds adjacent to the base, wherein the desired birds are defined as having a smaller size than the undesired birds; and
    a plurality of guards being coupled to the housing and being configured to prevent undesired birds from landing on the bird support, the plurality of guards extending outwardly away from the hopper and being distributed along the bird support, each pair of adjacent guards of the plurality of guards being spaced from each other at a spacing configured to obstruct the undesired birds from landing on the bird support between one of the pairs of adjacent guards.

2. The apparatus of claim 1, wherein the base has a perimeter lip being coupled to and extending around the platform, the perimeter lip protruding upwardly from the platform to constrain the birdseed to the upper surface of the platform.

3. The apparatus of claim 1, wherein the hopper comprises an outer wall wherein an interior space is bounded by the outer wall, the outer wall having at least one opening extending therethrough and into the interior space, the at least one opening being positioned adjacent to the platform such that birdseed contained in the hopper flows outwardly of the hopper through the at least one opening and onto the platform.

4. The apparatus of claim 3, wherein the at least one opening includes a plurality of openings, each opening of the plurality of openings being positioned adjacent to the platform such that birdseed contained in the hopper flows outwardly of the hopper through each of the plurality of openings and onto the platform, the plurality of openings being circumferentially arranged around the hopper.

5. The apparatus of claim 4, wherein the bird support comprises a plurality of perches being outwardly spaced from the base, each perch of the plurality of perches being radially aligned with one of the openings of the hopper, each guard of the plurality of guards being positioned between adjacent perches of the plurality of perches.

6. The apparatus of claim 4, wherein the openings of the plurality of openings are evenly spaced from each other.

7. The apparatus of claim 1, wherein at least a portion of the outer wall is translucent to facilitate viewing of the interior space through the outer wall.

8. The apparatus of claim 1, wherein the spacing of each adjacent pair of guards of the plurality of guards is less than 7.5 inches.

9. The apparatus of claim 1, wherein each guard of the plurality of guards comprises a wire, the wire of each guard of the plurality of guards extending arcuately from the hopper to the bird support and having a concave side facing the hopper.

10. The apparatus of claim 9, wherein the wire of each guard of the plurality of guards has a first hooked end and a second hooked end, the hopper having a plurality of apertures extending therethrough, the first hooked end of the wire of each guard of the plurality of guards engaging one of the plurality of apertures, the bird support having a plurality of holes extending therethrough, the second hooked end of the wire of each guard of the plurality of guards engaging one of the plurality of holes.

11. A birdfeeder apparatus for preventing undesired birds from landing thereon, the apparatus comprising:
- a housing being configured for holding birdseed and comprising:
  - a base having a platform with an upper surface for supporting the birdseed thereon, the base having a perimeter lip being coupled to and extending around the platform, the perimeter lip protruding upwardly from the platform to constrain the birdseed to the upper surface of the platform;
  - a hopper being coupled to and extending upwardly from the base, the hopper being configured to contain the birdseed and dispense the birdseed out of the hopper and onto the platform, the hopper comprising an outer wall wherein an interior space is bounded by the outer wall, the outer wall having a plurality of openings extending therethrough and into the interior space, each opening of the plurality of openings being positioned adjacent to the platform such that birdseed contained in the hopper flows outwardly of the hopper through each of the plurality of openings and onto the platform, the plurality of openings being circumferentially arranged around the hopper, the plurality of openings being evenly spaced from each other, at least a portion of the outer wall being translucent to facilitate viewing of the interior space through the outer wall; and
  - a bird support being coupled to the base and being configured to support desired birds adjacent to the base, wherein the desired birds are defined as having a smaller size than the undesired birds, the bird support comprising a plurality of perches being outwardly spaced from the base, each perch of the plurality of perches being radially aligned with one of the openings of the hopper; and
- a plurality of guards being coupled to the housing and being configured to prevent undesired birds from landing on the bird support, the plurality of guards extending outwardly away from the hopper and being distributed along the bird support, each pair of adjacent guards of the plurality of guards being spaced from each other at a spacing configured to obstruct the undesired birds from landing on the bird support between one of the pairs of adjacent guards, the spacing being less than 7.5 inches, each guard of the plurality of guards being positioned between adjacent perches of the plurality of perches, each guard of the plurality of guards comprising a wire, the wire of each guard of the plurality of guards extending arcuately from the hopper to the bird support and having a concave side facing the hopper, the wire of each guard of the plurality of guards having a first hooked end and a second hooked end, the hopper having a plurality of apertures extending therethrough, the first hooked end of the wire of each guard of the plurality of guards engaging one of the plurality of apertures, the bird support having a plurality of holes extending therethrough, the second hooked end of the wire of each guard of the plurality of guards engaging one of the plurality of holes.

\* \* \* \* \*